United States Patent
Jamison et al.

(10) Patent No.: US 9,567,836 B2
(45) Date of Patent: Feb. 14, 2017

(54) SYSTEMS AND METHODS FOR OPTIMIZING DRILLING OPERATIONS USING TRANSIENT CUTTINGS MODELING AND REAL-TIME DATA

(71) Applicant: Halliburton Energy Services, Inc., Houston, TX (US)

(72) Inventors: Dale E. Jamison, Humble, TX (US); Robert L. Williams, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 262 days.

(21) Appl. No.: 14/381,280

(22) PCT Filed: Nov. 12, 2013

(86) PCT No.: PCT/US2013/069581
§ 371 (c)(1),
(2) Date: Aug. 27, 2014

(87) PCT Pub. No.: WO2015/072962
PCT Pub. Date: May 21, 2015

(65) Prior Publication Data
US 2016/0245048 A1    Aug. 25, 2016

(51) Int. Cl.
| | | |
|---|---|---|
| E21B 41/00 | (2006.01) | |
| E21B 44/06 | (2006.01) | |
| E21B 21/08 | (2006.01) | |
| E21B 44/00 | (2006.01) | |
| E21B 44/02 | (2006.01) | |
| E21B 44/04 | (2006.01) | |

(Continued)

(52) U.S. Cl.
CPC .......... *E21B 41/0092* (2013.01); *E21B 21/08* (2013.01); *E21B 44/00* (2013.01); *E21B 44/02* (2013.01);
(Continued)

(58) Field of Classification Search
USPC ........................................................ 175/25
See application file for complete search history.

(56) References Cited

U.S. PATENT DOCUMENTS

| | | |
|---|---|---|
| 5,455,780 A | 10/1995 | Nguyen et al. |
| 7,249,636 B2 | 7/2007 | Ohmer |

(Continued)

FOREIGN PATENT DOCUMENTS

| | | |
|---|---|---|
| WO | 2008094944 A1 | 8/2008 |
| WO | 2015072962 A1 | 5/2015 |

OTHER PUBLICATIONS

International Search Report and Written Opinion for PCT/US2013/069581 dated Aug. 8, 2014.

(Continued)

*Primary Examiner* — Taras P Bemko
(74) *Attorney, Agent, or Firm* — McDermott Will & Emery LLP; Tenley Krueger

(57) ABSTRACT

Systems and methods for optimizing drilling results may be based on, inter alia, (1) real-time data collected during drilling, (2) a transiently modeled cuttings distribution along the wellbore, and optionally (3) a theoretical change to one or more operational parameters. In some instances, methods may include drilling a wellbore penetrating a subterranean formation while circulating a drilling fluid; gathering real-time data about the drilling; calculating a cuttings distribution along the wellbore based on the real-time data using a transient model; calculating an equivalent circulating density profile along the wellbore based on (1) real-time data collected during drilling, (2) a transiently modeled cuttings distribution along the wellbore, and optionally (3) a theoretical change; and changing at least one operational parameter based on a comparison of the equivalent circulating density profile to a fracture gradient of the subterranean formation.

17 Claims, 7 Drawing Sheets

(51) Int. Cl.
 E21B 45/00 (2006.01)
 E21B 47/024 (2006.01)
 E21B 47/04 (2012.01)
 E21B 47/06 (2012.01)
 E21B 47/10 (2012.01)
 E21B 49/00 (2006.01)
 G06F 17/10 (2006.01)

(52) U.S. Cl.
 CPC .............. *E21B 44/04* (2013.01); *E21B 44/06* (2013.01); *E21B 45/00* (2013.01); *E21B 47/024* (2013.01); *E21B 47/04* (2013.01); *E21B 47/06* (2013.01); *E21B 47/065* (2013.01); *E21B 47/10* (2013.01); *E21B 49/003* (2013.01); *G06F 17/10* (2013.01)

(56) References Cited

U.S. PATENT DOCUMENTS

| | | |
|---|---|---|
| 7,453,768 B2 | 11/2008 | Hall et al. |
| 8,527,249 B2 | 9/2013 | Jamison et al. |
| 2004/0060738 A1 | 4/2004 | Hemphill |
| 2005/0038603 A1 | 2/2005 | Thomas et al. |
| 2006/0113110 A1* | 6/2006 | Leuchtenberg ......... E21B 21/08 175/38 |
| 2007/0107938 A1 | 5/2007 | Cornish et al. |
| 2008/0314137 A1* | 12/2008 | Proett ..................... E21B 49/10 73/152.22 |
| 2009/0033516 A1 | 2/2009 | Alteirac et al. |
| 2011/0153296 A1* | 6/2011 | Sadlier .................... E21B 44/00 703/7 |
| 2011/0186290 A1 | 8/2011 | Roddy et al. |
| 2011/0203845 A1 | 8/2011 | Jamison et al. |
| 2012/0249338 A1 | 10/2012 | Merino |
| 2013/0292178 A1 | 11/2013 | Burress et al. |

OTHER PUBLICATIONS

Examination Report received in corresponding Australian Application No. 2013405232, dated Jul. 5, 2016.

Written Opinion received in corresponding Singapore Application No. 11201502909R, dated Jul. 4, 2016.

* cited by examiner

SYSTEMS AND METHODS FOR OPTIMIZING DRILLING OPERATIONS USING TRANSIENT CUTTINGS MODELING AND REAL-TIME DATA

BACKGROUND

The exemplary embodiments described herein relate to systems and methods for optimizing drilling results based on, inter alia, (1) real-time data collected during drilling, (2) a transiently modeled cuttings distribution along the wellbore, and optionally (3) a theoretical change to one or more operational parameters.

Once a prospective reservoir of oil or natural gas in a subterranean formation has been located a drilling rig is set up to drill a wellbore penetrating the subterranean formation. The drilling rig includes power systems, mechanical motors, a rotary turntable drill, and a circulation system that circulates drilling fluid, sometimes called "mud," throughout the borehole. The fluid serves to remove materials, sometimes called "cuttings," as the drill bit loosens them from the surrounding rock during drilling and to maintain adequate wellbore pressure.

At least some drilling operations involve rotating a drill bit at the distal end of the pipe, sometimes called "drill string," and transmitting rotary motion to the drill bit using a multi-sided pipe known as a "kelly" with a turntable. In other drilling operations, the drill bit is rotated with a motor near the drill bit such that the drill string does not rotate. In both cases, as drilling progresses, drilling fluid circulates through the pipe and out of the drill bit into the wellbore. The cuttings are removed from the wellbore by the circulating drilling fluid. New sections are added to the pipe progressively as the drilling continues to extend the drill bit further into the subterranean formation. Once a desired depth is reached, drilling is completed. Various tests can be conducted at this point to precisely locate and isolate portions of the formation housing the desired hydrocarbon deposits.

Drilling operations are extremely expensive and time consuming. For example, drilling operations at an offshore rig can cost in excess of $500,000 to $1,000,000 per day. Therefore, increasing drilling efficiency or productivity, even to a small degree, can lead to huge monetary savings.

The efficiency of a drilling operation is generally determined by the ratio of productive rig time (e.g., time spent drilling) ("PRT") to non-productive time ("NPT"). During a drilling operation, it is desirable to maximize this ratio because NPT has a cost with minimal to no associated payout. Further, it is desirable to minimize the total time (i.e., PRT plus NPT) to minimize costs.

Minimizing rig time may be achieved by increasing the rate of penetration of the drill bit through the subterranean formation without the equivalent circulating density ("ECD") exceeding the fracture gradient. Generally, the fracture gradient (which varies along the length of the wellbore) is the pressure at which the formation will fracture, and the ECD is a measure of the pressure that the drilling fluid exerts on the formation. When the ECD exceeds the fracture gradient, the formation will fracture. Unintentional fracturing of the formation can lead to lost circulation that may require remedial operations that contribution to NPT.

In some instances, modeling programs that use steady-state approximations are used to estimate the ECD and compare it to the fracture gradient. Steady-state approximations typically use an average of the drilling parameters/operations and apply those averages to determining an ECD at any point during drilling. For example, a well cleaning method during a drilling operation may average about 5 minutes and be performed on average every 45 minutes. During a well cleaning method, drilling ceases, so cuttings are not produced. This change in concentration of cuttings changes the ECD for that portion of the drilling fluid. Steady-state approximations of ECD would not take into account a well cleaning operation with a different time. This example can be extended to other drilling parameters including rate of penetration into the subterranean formation, length of connection times, and rpm variations for the drill bit. Collectively, these introduce varying levels of error into the modeling program. To account for this error, drilling is performed at an ECD sufficiently lower than the fracture gradient to mitigate formation fracture and resultant fluid loss and lost circulation.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The exemplary embodiments described herein relate to systems and methods for optimizing drilling results based on, inter alia, (1) real-time data collected during drilling, (2) a transiently modeled cuttings distribution along the wellbore, and optionally (3) a theoretical change to one or more operational parameters.

The methods and systems described herein use drilling simulations that advantageously include inputs from real-time data and a transient model of the cuttings distribution along the wellbore. This transient modeling of the cuttings based on real-time data provides a more accurate ECD profile in the wellbore, which allows for operating closer to the fracture gradient with less risk of formation fracture, thereby mitigating NPT. Closer operation to the fracture gradient also allows for, inter alia, increasing rate of penetration, which reduces the PRT. Together the total drilling time, and associated cost, can be decreased.

Further, the systems and method described herein may be configured, in some embodiments, to use the drilling simulator to predict the ECD in response to theoretical changes in the operational parameters (e.g., trajectory of the drill bit, properties of the drilling fluid, and rate of penetration into the subterranean formation). The operational parameter changes may bring the ECD closer to the fracture gradient when implemented, which may increase the efficiency of the drilling operation. Further, the operational parameters that may cause the ECD to exceed the fracture gradient may be avoided, thereby mitigating NPT.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as strength, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

Figure 1:
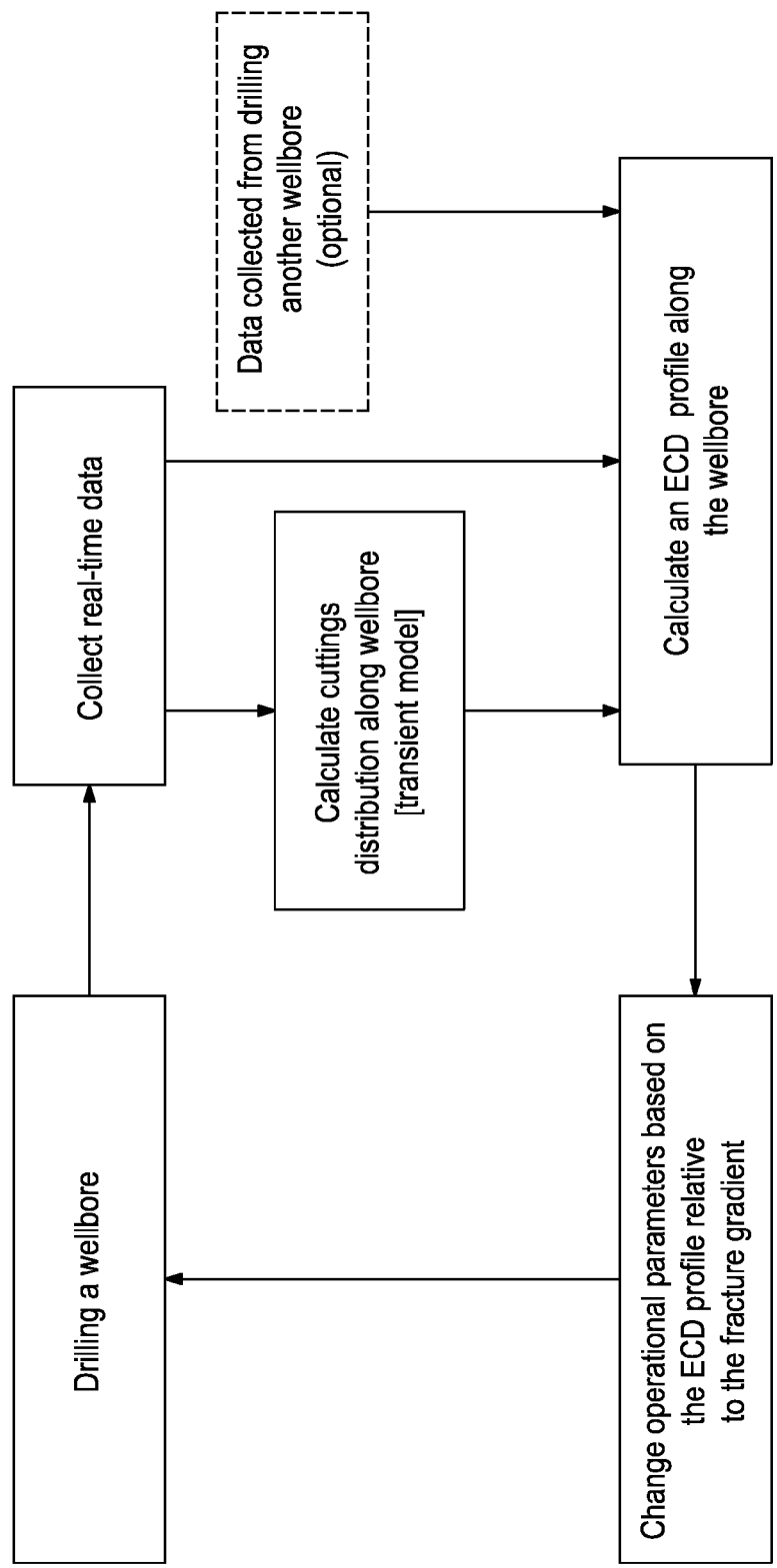
FIG. 1 provides a flow diagram for drilling a wellbore according to an exemplary embodiment described herein.

FIG. 1 provides an exemplary flow diagram for drilling a wellbore according to an exemplary embodiment described herein. While drilling a wellbore, real-time data may be collected. Examples of real-time data to be collected may include, but are not limited to, flow rate of the drilling fluid, viscosity of the drilling fluid, density (or weight) of the drilling fluid, revolutions per minute of the drill bit, rate of penetration into the subterranean formation, torque applied to the drill string, trajectory of the drill bit, weight on bit (e.g., for calculating characteristics of the cuttings produced during drilling), measured depth, true vertical depth, formation composition (e.g., for calculating wellbore stresses and time-dependent fracture gradients), temperature (e.g., for calculating fluid viscosity changes), pressure (e.g., for calculating expansion and contraction of fluids), and the like, and any combination thereof. As used herein, the term "measured depth" refers to the length of the wellbore, which depending on the trajectory of the wellbore may be equal to or greater than the true vertical depth. As used herein, the term "true vertical depth" refers to the depth of the wellbore measured in a straight line perpendicular to the surface.

The real-time data collected during the drilling operation may be measurements from sensors in the wellbore, sensors in the drill bit, sensors along the drill string, sensors at the well head, sensors in wellbore tools on the drilling rig (e.g., shakers and pumps), and the like, and any combination thereof. One of ordinary skill in the art with the benefit of this disclosure would recognize the types of sensors that can be employed for the desired measurement (e.g., temperature sensors, pressure sensors, flow rate sensors, viscometers, and the like).

In some instances, the real-time data may be calculated from such measurements. For example, ECD may be calculated based on, inter alia, the measured viscosity of the drilling fluid, wellbore pressure, and the like. In another example, the morphology, density changes, and attrition size and rate of the cuttings may be calculated from fluid composition, formation composition, shear history, and tortuosity of the wellbore. These properties of the cuttings would affect the distribution of the cuttings in the wellbore because these properties affect the transport of cuttings through the wellbore (e.g., transportation rates, settling rates, and the like).

Referring again to FIG. 1, using the real-time data or a portion thereof as an input, a transient model may be used to calculate the cuttings distribution along the length of the wellbore produced during drilling. In some instances, drilling operations are halted briefly such that the drilling fluid is no longer circulating (e.g., during NPT). The transient model may, in some instance, be capable of calculating the cuttings distribution along the wellbore taking into account settling of the cuttings during the NPT.

Calculating the cuttings distribution (i.e., distribution of cuttings along the wellbore or a portion thereof) may be achieved with a transient model that takes into consideration a plurality of factors that affect the amount of cuttings produced and their transport up and out of the wellbore. The real-time data described herein may be used as inputs to the transient model. For example, a higher viscosity fluid may reduce settling of the cuttings when the flow rate of the drilling fluid is reduced or stopped. Further, at higher temperatures, the cuttings may settle more quickly when the flow rate of the drilling fluid is reduced or stopped. As the temperature typically varies along the length of the wellbore, the settling rate of the cuttings at various points or sections along the wellbore may vary. Further, as the cuttings travel through the wellbore, attrition occurs, which changes the size, shape, and concentration of the cuttings. In some instances, cuttings attrition may be accounted for in the transient model. Transient models described herein would include several inputs from real-time data to produce a cuttings distribution.

Figure 2:
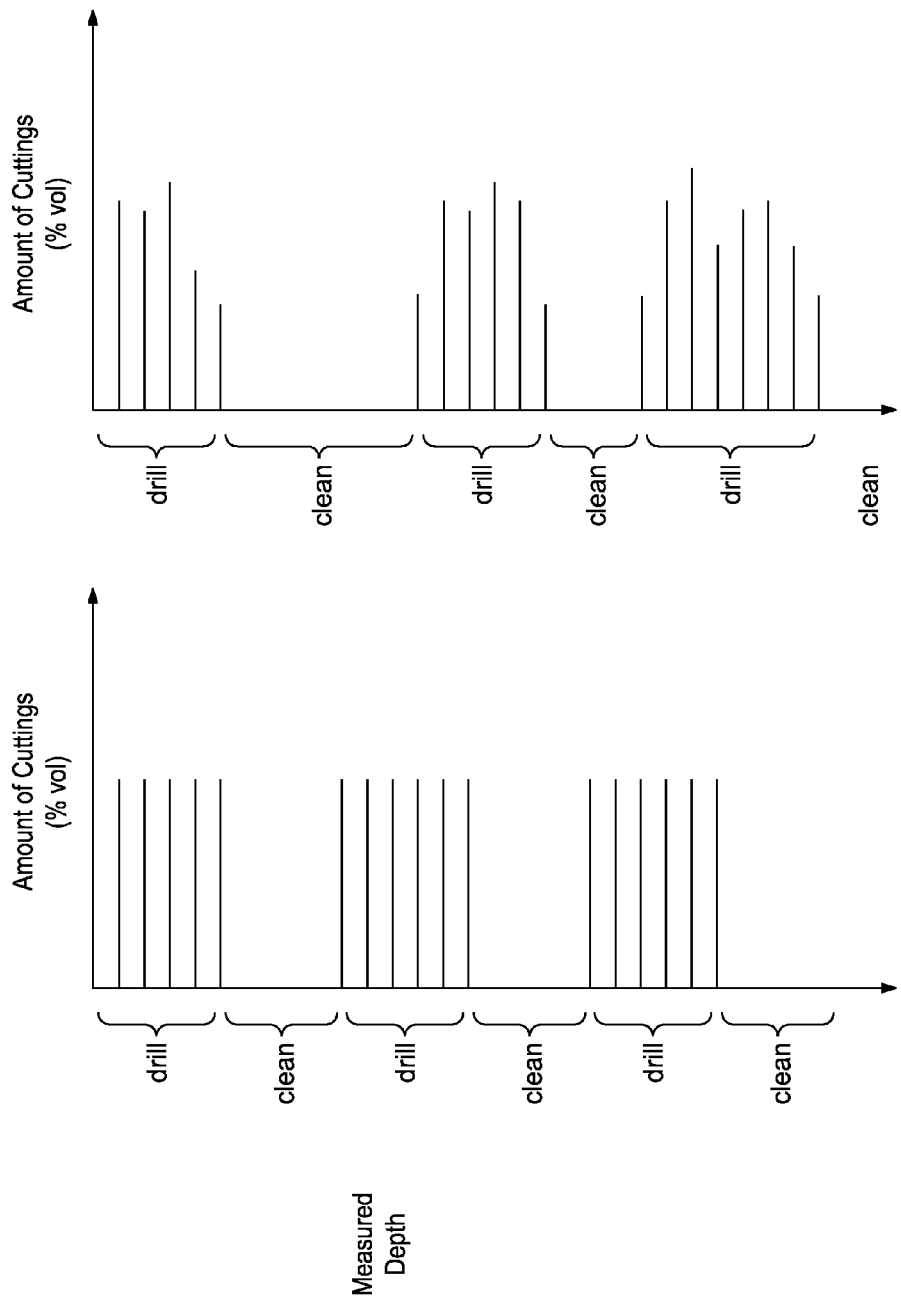
FIG. 2A provides a theoretical illustration of a cuttings distribution based on a steady-state model.
FIG. 2B provides a theoretical illustration of a cuttings distribution based on a transient model.

FIGS. 2A and 2B provide illustrations of a theoretical cuttings distribution for a steady-state model and a transient model described herein, respectively, for a portion of a drilling operation with three cleaning cycles. The steady-state model would assume the amount of cuttings produced while drilling is constant and the length of clean times is constant. The resultant cuttings distribution may be as depicted in FIG. 2A that resembles an on/off graph with a sharp concentration change between the drilling and cleaning. In contrast, using a transient model described herein, the concentration of cuttings is dependent on real-time data like rate of penetration, fluid flow rate, and the like, the resultant cuttings distribution illustrated in FIG. 2B may reflect that as drilling begins and ends that the amount of cuttings produced is different, and typically less, than the amount of cuttings produced in the middle of the drilling cycle. While this is an illustrative and rather simple comparison, one of ordinary skill in the art would recognize the additional differences that may be seen with other factors considered like settling rate, viscosity variations in the drilling fluid with temperature and pressure, flow rate of the drilling fluid, revolutions per minute of the drill bit, and the like.

In some instances, the cuttings distribution along the wellbore may be reported and/or analyzed as individual data points. In some instances, the wellbore may be divided into sections (not necessarily of the same length) where the wellbore conditions (e.g., temperature and pressure) and the geometry are similar. The amount of cuttings (e.g., volume percent) may be averaged for each section or a portion thereof. In some instances, the cuttings distribution may be reported as individual data points, an average volume percent of cuttings in each section, or a hybrid thereof.

Referring again to FIG. 1, an ECD profile along the wellbore may be calculated based on (1) the real-time data collected during drilling, (2) the cuttings distribution calculated with a transient model (i.e., based on real-time data as compared to steady-state approximations), and optionally (3) data collected from a previous drilling operation into the subterranean formation or a similar subterranean formation. The ECD is related to, inter alia, the viscosity of the drilling fluid, which is related to the concentration and properties (e.g., size and shape) of cuttings in the drilling fluid, the viscosity of the drilling fluid, the weight of the drilling fluid, the temperature in the wellbore, the pressure in the wellbore, and the like.

In some embodiments, the resultant ECD profile may be compared to the fracture gradient of the subterranean formation. Then, at least one operational parameter (e.g., drilling parameters, fluid parameters, and the like) may be changed based on the comparison. For example, if the ECD is too close to the fracture gradient, the rate of penetration may be reduced, the mud weight may be reduced, the flow rate of the fluid may be decreased, and any combination thereof. In another example, if the ECD is sufficiently far from the fracture gradient, operational parameters like rate of penetration and mud weight may be changed to more efficiently drill the wellbore with an ECD close to the fracture gradient. One skilled in the art would recognize the plurality of operational parameters that may be manipulated and how to manipulate such operational parameters to achieve a desired change in ECD.

Figure 3:
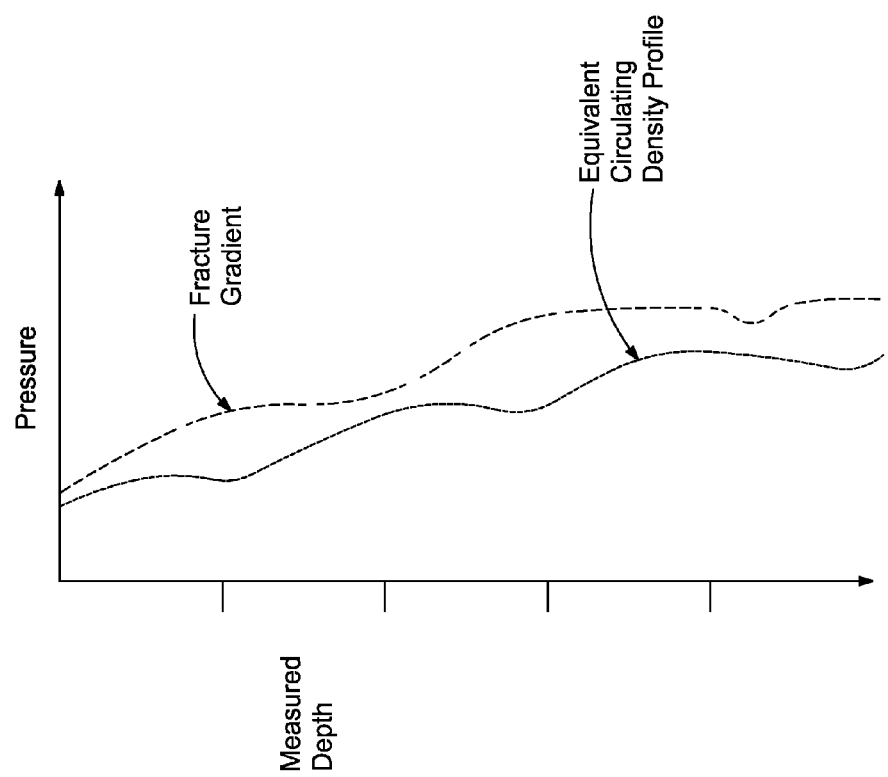
FIG. 3 provides a theoretical illustration comparing a fracture gradient and an ECD profile.

For example, as illustrated in FIG. 3, an ECD profile and fracture gradient may be plotted as a function of pressure versus measured depth. As illustrated in FIG. 3, the ECD profile does not exceed the fracture gradient and may be sufficiently lower than the fracture gradient to allow for changing an operational parameter to increase the ECD.

In some instances, a transient model for calculating cuttings distribution along the wellbore may be utilized in a predictive method. Similar to above, an ECD profile may be calculated based on (1) the real-time data collected during drilling, (2) the cuttings distribution calculated with a transient model, and optionally (3) data collected from a previous drilling operation into the subterranean formation or a similar subterranean formation. However, additional inputs of (4) theoretical changes to the operational parameters may be used to calculate (e.g., with a drilling simulator) a plurality of predicted ECD profiles that can be used analyzed when choosing an operational parameter change.

Examples of suitable drilling simulators may include DFG™ Software with DRILLAHEAD® Hydraulics Module (available from Halliburton Energy Services, Inc.) adapted to include inputs from the transient model of the cuttings distribution and the real-time data collected during drilling. Further, in some instances, the DFG™ Software with DRILLAHEAD® Hydraulics Module may be further adapted to include inputs from data collected from a previous drilling operation into the subterranean formation.

Figure 4:
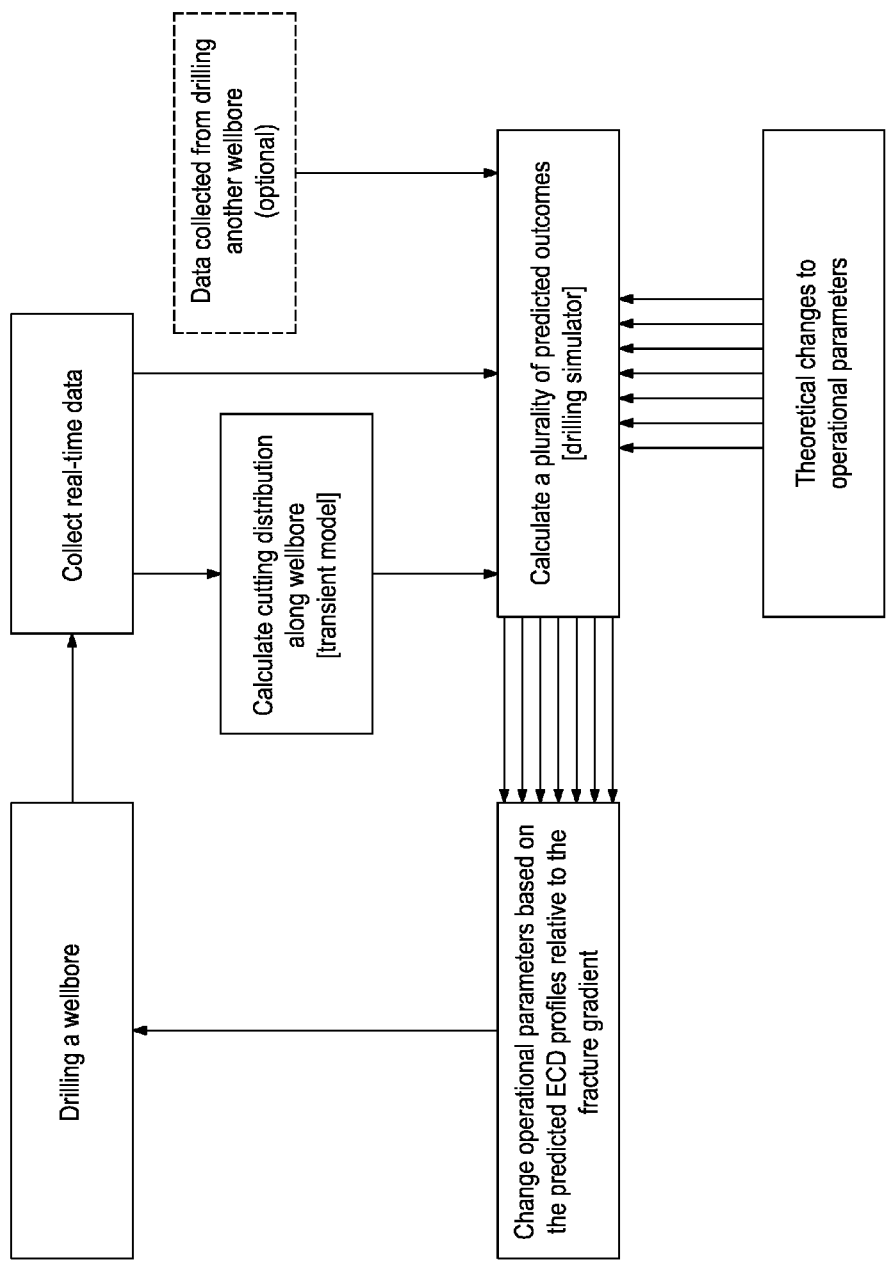
FIG. 4 provides a flow diagram for drilling a wellbore according to an exemplary embodiment described herein.

Examples of operational parameters that may be changed based on the ECD profile from FIG. 1 or the predicted ECD profiles of FIG. 4 may include, but are not limited to, flow rate of the drilling fluid, viscosity of the drilling fluid, density (or weight) of the drilling fluid, lubricity of the drilling fluid, fluid composition (e.g., oil based mud vs water or emulsion muds or additives in the fluid), revolutions per minute of the drill bit, rate of penetration into the subterranean formation, torque applied to the drill string, trajectory of the drill bit (e.g., which may change measured depth and true vertical depth), weight on bit, wellbore pressure (e.g., with managed pressure drilling), and the like, and any combination thereof. Further, such operational parameters may be used as the operational parameters to which theoretical changes are made in FIG. 4. For example, if the ECD profile or predicted ECD profile is close to the fracture gradient, operational parameters may be changed to reduce the ECD profile (e.g., reduce mud weight, lower the flow rate, lower the rate of penetration, and lower the viscosity of the mud). In another example, to reduce the ECD profile, drilling may be stopped to clean the wellbore.

In some instances, an operator may provide the inputs to the drilling simulator as to the operational parameter changes to be modeled. For example, each operational parameter (or a subset thereof) may have an upper and lower limit and an analysis increment that can be input by an operator, such that the drilling simulator may predict the ECD profile iteratively based on the values between the upper and lower limits at the analysis increments. For example, the effect of the rate of penetration on the ECD may be analyzed between a 5% reduction to 5% increase at 1% increments based on the present rate of penetration. In some instances, the results may be displayed for an operator to determine if the change should be implemented. In some instances, the drilling simulator may automatically implement the changes where the operator has optionally included limits as to the extent of the changes that may be automatically implemented. For example, the rate of penetration may be analyzed as described above and implemented automatically where the operator has included limits as to the absolute values of the rate of penetration. The drilling simulator may alert the operator as to if the operational parameter should be adjusted to outside the operator's limits, so that the operator may decide to adjust such limits. One skilled in the art with the benefit of this disclosure would recognize that this example may be extended to other parameters described herein and combinations of two or more parameters.

In some instances, collecting real-time data and subsequent calculations (e.g., as illustrated in the methods in FIG. 1 and FIG. 4) may be performed continuously, at specific time intervals, on-demand by an operator, or a hybrid thereof. For example, real-time data, like revolutions per minute of the drill bit and rate of penetration into the subterranean formation, may be collected continuously, while real-time data, like temperature, is collected periodically (e.g., at specific time intervals or on-demand by the operator). In another example, a hybrid of the methods illustrated in FIGS. 1 and 4 may be employed where the ECD profile of FIG. 1 is calculated continuously or at specific time intervals and the predicted ECD profile of FIG. 4 is calculated at specific time intervals or on-demand by an operator. For example, if drilling is occurring such that the ECD may be increased, a predictive model may be used to determine which operational parameters to manipulate to achieve a desired change in ECD.

By engaging in the mathematical and statistical analysis that combine data sources, especially real-time data and transient modeling, the exemplary embodiments described herein can develop ECD profiles and projected ECD profiles along the wellbore as any number of operational parameters are manipulated or theoretically manipulated. This provides more accurate information to the operator so that drilling may be more efficient with less risk of formation fracture and lost circulation.

In some embodiments, the steps of collecting the real-time data, calculating the cuttings distribution, calculating the plurality of predicted ECD profiles, optionally inputting theoretical changes, and optionally changing the operational parameters may be operated under computer control, remotely and/or at the well site. In some embodiments, the computer and associated algorithm for each of the foregoing can produce an output that is readable by an operator who can manually change the operational parameters.

It is recognized that the various embodiments herein directed to computer control and artificial neural networks, including various blocks, modules, elements, components, methods, and algorithms, can be implemented using computer hardware, software, combinations thereof, and the like. To illustrate this interchangeability of hardware and software, various illustrative blocks, modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a "machine-readable medium" refers to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

In some embodiments, the data collected during a drilling operation can be archived and used in future operations. In addition, the data and information can be transmitted or otherwise communicated (wired or wirelessly) to a remote location by a communication system (e.g., satellite communication or wide area network communication) for further analysis. The communication system can also allow for monitoring and/or performing of the methods described herein (or portions thereof).

Figure 7:
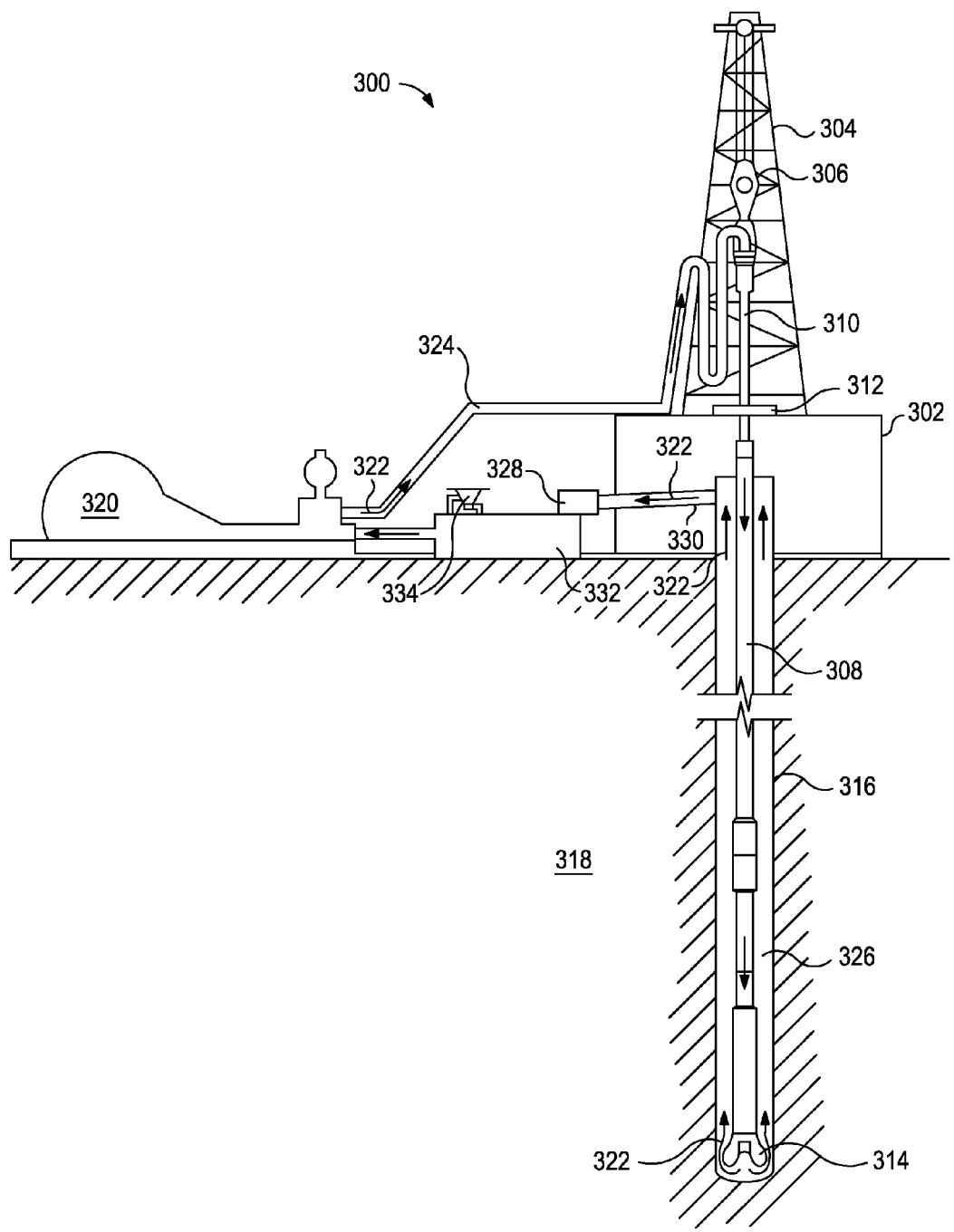
FIG. 7 illustrates a drilling assembly suitable for use in conjunction with at least one embodiment described herein.

As illustrated in FIG. 7, some embodiments may be a drilling assembly 300. It should be noted that while FIG. 7 generally depicts a land-based drilling assembly, those skilled in the art will readily recognize that the principles described herein are equally applicable to subsea drilling operations that employ floating or sea-based platforms and rigs, without departing from the scope of the disclosure.

The drilling assembly 300 may include a drilling platform 302 that supports a derrick 304 having a traveling block 306 for raising and lowering a drill string 308. The drill string 308 may include, but is not limited to, drill pipe and coiled tubing, as generally known to those skilled in the art. A kelly 310 supports the drill string 308 as it is lowered through a rotary table 312. A drill bit 314 is attached to the distal end of the drill string 308 and is driven either by a downhole motor and/or via rotation of the drill string 308 from the well surface. As the bit 314 rotates, it creates a borehole (or wellbore) 316 that penetrates various subterranean formations 318.

A pump 320 (e.g., a mud pump) circulates wellbore fluid 322 through a feed pipe 324 and to the kelly 310, which conveys the wellbore fluid 322 downhole through the interior of the drill string 308 and through one or more orifices in the drill bit 314. The wellbore fluid 322 is then circulated back to the surface via an annulus 326 defined between the drill string 308 and the walls of the borehole 316. At the surface, the recirculated or spent wellbore fluid 322 exits the annulus 326 and may be conveyed to one or more fluid processing unit(s) 328 via an interconnecting flow line 330. After passing through the fluid processing unit(s) 328, a "cleaned" wellbore fluid 322 is deposited into a nearby retention pit 332 (i.e., a mud pit). While illustrated as being arranged at the outlet of the borehole 316 via the annulus 326, those skilled in the art will readily appreciate that the fluid processing unit(s) 328 may be arranged at any other location in the drilling assembly 300 to facilitate its proper function, without departing from the scope of the scope of the disclosure.

The wellbore fluids 322 may be produced with a mixing hopper 334 communicably coupled to or otherwise in fluid communication with the retention pit 332. The mixing hopper 334 may include, but is not limited to, mixers and related mixing equipment known to those skilled in the art. In other embodiments, however, the wellbore fluid 322 may be produced at any other location in the drilling assembly 300. In at least one embodiment, for example, there could be more than one retention pit 332, such as multiple retention pits 332 in series. Moreover, the retention pit 332 may be representative of one or more fluid storage facilities and/or units where the disclosed individual wellbore fluid components may be stored, reconditioned, and/or regulated until added to the wellbore fluid 322.

One or more sensors, gauges, and the like for measuring the real-time data described herein (e.g., wellbore fluid properties, wellbore conditions relating to a section of the wellbore, operational parameters, and combinations thereof) may be coupled to at least one of the pump 320, the drill string 308, the rotary table 312, the drill bit 314, and the like. The data from these sensors, gauges, and the like may be transmitted (wired or wirelessly) to a computing station that implements calculating cuttings distributions and the like based on at least based on (1) the cuttings distribution and (2) the real-time data and provides an equivalent circulating density profile and the like, which may be used for changing at least one operational parameter based on comparisons and analyses described herein.

Embodiments disclosed herein include:

A. a method that includes drilling a wellbore penetrating a subterranean formation while circulating a drilling fluid; gathering real-time data about the drilling, the real-time data comprising at least one selected from the group consisting of a flow rate of the drilling fluid, a viscosity of the drilling fluid, a density of the drilling fluid, revolutions per minute of a drill bit, a rate of penetration into the subterranean formation, a torque applied to a drill string, a trajectory of the drill bit, a weight on the drill bit, a measured depth, a true vertical depth, a composition of the subterranean formation, a temperature, a pressure, and any combination thereof; calculating a cuttings distribution along the wellbore based on the real-time data using a transient model; calculating an equivalent circulating density profile along the wellbore based on (1) the cuttings distribution and (2) the real-time data; and changing at least one operational parameter based on a comparison of the equivalent circulating density profile to a fracture gradient of the subterranean formation;

B. a method that includes drilling a wellbore penetrating a subterranean formation; gathering real-time data about the drilling, the real-time data comprising at least one selected from the group consisting of a flow rate of the drilling fluid, a viscosity of the drilling fluid, a density of the drilling fluid, revolutions per minute of a drill bit, a rate of penetration into the subterranean formation, a torque applied to a drill string, a trajectory of the drill bit, a weight on the drill bit, a measured depth, a true vertical depth, a composition of the subterranean formation, a temperature, a pressure, and any combination thereof; calculating a cuttings distribution based on the real-time data using a transient model; calculating a plurality of predicted equivalent circulating density profiles along the wellbore based on (1) a theoretical change to at least one operational parameter, (2) the cuttings distribution, and (3) the real-time data; and changing at least one of the operational parameters based on a comparison of the predicted equivalent circulating density profiles to a fracture gradient of the subterranean formation; and C. a method that includes drilling a wellbore penetrating a subterranean formation while circulating a drilling fluid; gathering real-time data about the drilling, the real-time data comprising at least one selected from the group consisting of a flow rate of the drilling fluid, a viscosity of the drilling fluid, a density of the drilling fluid, revolutions per minute of a drill bit, a rate of penetration into the subterranean formation, a torque applied to a drill string, a trajectory of the drill bit, a weight on the drill bit, a measured depth, a true vertical depth, a composition of the subterranean formation, a temperature, a pressure, and any combination thereof; calculating a cuttings distribution along the wellbore based on the real-time data using a transient model; calculating an equivalent circulating density profile along the wellbore based on (1) the cuttings distribution and (2) the real-time data; comparing the equivalent circulating density profile to a fracture gradient of the subterranean formation; calculating a plurality of predicted equivalent circulating density profiles along the wellbore based on (1) the cuttings distribution, (2) the real-time data, and (3) a theoretical change to at least one operational parameter; and changing at least one of the operational parameters based on a comparison of the predicted equivalent circulating density profiles to the fracture gradient of the subterranean formation.

Each of embodiments A, B, and C may have one or more of the following additional elements in any combination: Element 1: wherein the at least one operational parameter includes at least one selected from the group consisting of the flow rate of the drilling fluid, the viscosity of the drilling fluid, the density of the drilling fluid, a lubricity of the drilling fluid, a composition of the drilling fluid, the revolutions per minute of the drill bit, the rate of penetration into the subterranean formation, the torque applied to the drill string, the trajectory of the drill bit, the weight on the drill bit, the wellbore pressure, and any combination thereof; Element 2: the method further including halting the circulation of the drilling fluid through the wellbore for a time; and restarting the circulation of the drilling fluid through the wellbore; Element 3: wherein calculating the equivalent circulating density profile is further based on data collected from a previous drilling operation into the subterranean formation; Element 4: the method further including reporting the cuttings distribution as individual data points; Element 5: the method further including calculating the cuttings distribution involves dividing the wellbore into sections based on a wellbore condition and a wellbore geometry and calculating an average volume percent of cuttings in each section; Element 6: the method further including calculating the cuttings distribution involves dividing the wellbore into sections based on a wellbore condition and a wellbore geometry and calculating an average volume percent of cuttings in each section; and reporting the cuttings distribution as the average volume percent of cuttings in each section; Element 7: wherein the gathering of the real-time data is continuous; and Element 8: wherein the calculating of the equivalent circulating density profile is continuous.

By way of non-limiting example, exemplary combinations applicable to A, B, C include: Element 1 in combination with Element 2; Element 1 in combination with Element 4; Element 1 in combination with at least one of Elements 5-6; Element 1 in combination with at least one of Elements 7-8; Element 1 in combination with Element 4 and at least one of Elements 7-8; Element 1in combination with at least one of Elements 5-6 and at least one of Elements 7-8; Element 2 in combination with Element 4; Element 2 in combination with at least one of Elements 5-6; Element 2 in combination with at least one of Elements 7-8; Element 2 in combination with Element 4 and at least one of Elements 7-8; Element 2in combination with at least one of Elements 5-6 and at least one of Elements 7-8; Element 3 in combination with any of the foregoing; Element 3 in combination with Element 4; Element 3 in combination with at least one of Elements 5-6; Element 3in combination with at least one of Elements 7-8; Element 3 in combination with Element 4 and at least one of Elements 7-8; Element 3 in combination with at least one of Elements 5-6 and at least one of Elements 7-8; and Element 3 in combination with at least one of Elements 1-2.

Other embodiments described herein may include a drilling assembly that includes a drilling platform that supports a derrick having a traveling block for raising and lowering a drill string; a drill bit attached to the distal end of the drill string; a pump fluidly connected to the drill string; at least one sensor or gauge coupled to at least one of the drill string, the pump, and the drill bit; and a computing device in communication with and capable of receiving data from the at least one sensor or gauge and configured to perform the methods of Embodiments A-C, optionally including combinations of Elements 1-8.

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

To facilitate a better understanding of the embodiments of the present invention, the following examples of preferred or representative embodiments are given. In no way should the following examples be read to limit, or to define, the scope of the invention.

EXAMPLES

Figure 5:
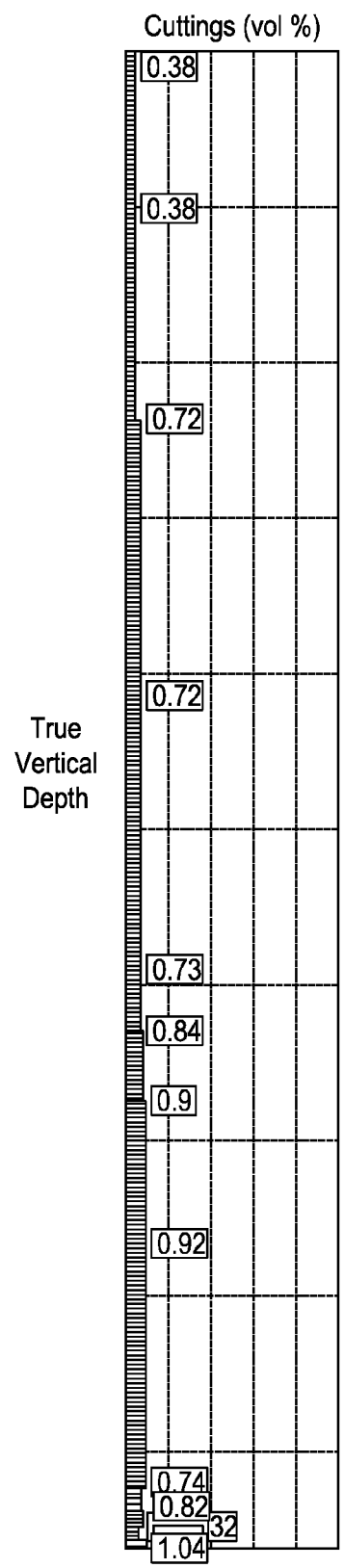
FIG. 5 provides a cuttings distribution based on a steady-state model applied to a drilling simulation.
Figure 6:
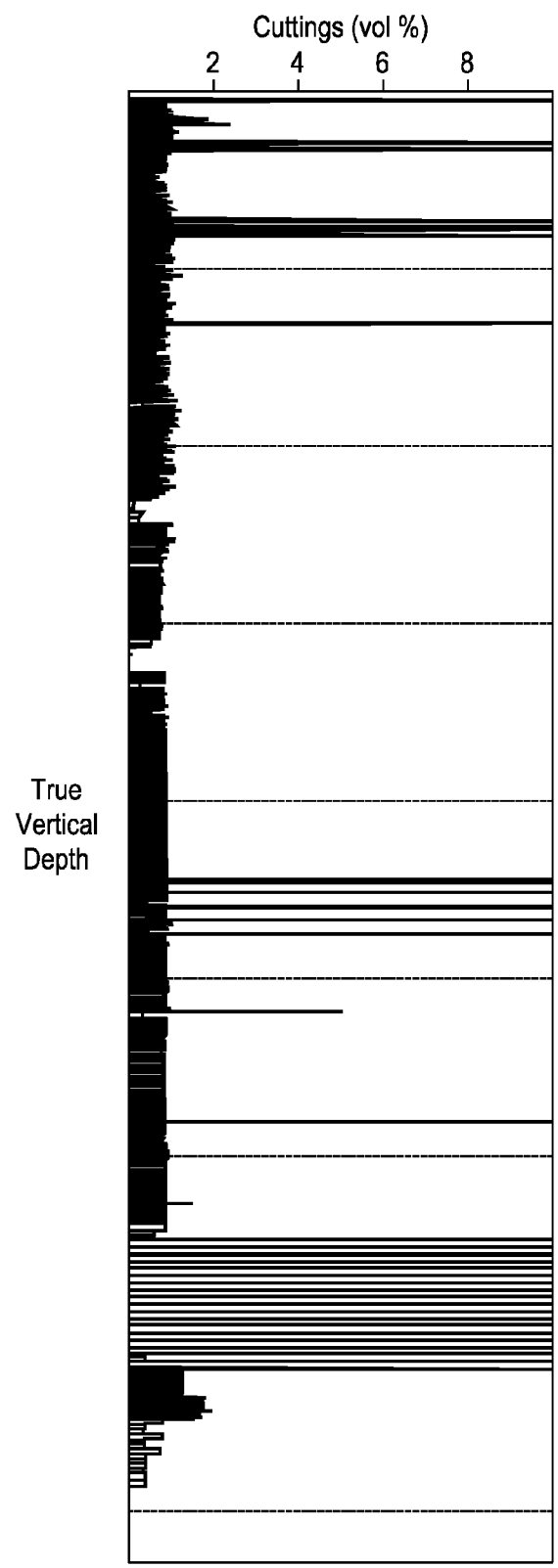
FIG. 6 provides a cuttings distribution based on a transient model applied to a drilling simulation.

Using a drilling simulator program, the ECD profile along the wellbore was calculated for (1) assuming no cuttings are produced, (2) using a steady-state model, and (3) using a transient cuttings model described herein. The drilling parameters in Table 1 were input into the drilling simulator. FIGS. 5 and 6 provide the cuttings distribution along the wellbore for methods (2) and (3), respectively. Table 2 provides the calculated ECD using methods (1)-(3).

TABLE 1

| Drilling Parameter | Value/Range of Values |
|---|---|
| rate of penetration | 25 ft/hr |
| RPM of the drill bit | 91.1 RPM |
| flow rate of the drilling fluid | 9.5 bpm primary, 9.0 bpm booster |
| viscosity of the drilling fluid | Herschel-Bulkley<br>n = 0.745<br>k = 0.538 lbf s$\hat{\ }$n/100 ft$^2$<br>tau0 = 5.33 lb/100 ft$^2$ |
| density of the drilling fluid | 14.8 ppg |
| Cutting size | 0.25 in |
| Cutting density | 2.6 SG |
| Hole cleaning time (for steady state) | 5 min |
| Connection time (for steady state) | 5 min |

TABLE 2

| Measured Depth (ft) | Total Vertical Depth (ft) | Wellbore Diameter (in) | ECD without Cuttings (ppg) | ECD with Cuttings (Steady-State) (ppg) | ECD with Cuttings (Transient Cuttings) (ppg) |
|---|---|---|---|---|---|
| 2525 ft | 2525 ft | 19.50 in | 14.941 | 14.9880 | 14.9673 |
| 5906 ft | 5906 ft | 19.50 in | 14.999 | 15.0454 | 15.0247 |
| 10356 ft | 10356 ft | 12.30 in | 15.127 | 15.1734 | 15.1629 |
| 14749 ft | 14748 ft | 12.30 in | 15.186 | 15.2321 | 15.2254 |
| 15711 ft | 15696 ft | 12.30 in | 15.197 | 15.2432 | 15.2371 |
| 16866 ft | 16763 ft | 12.30 in | 15.210 | 15.2560 | 15.2509 |
| 19130 ft | 18740 ft | 12.30 in | 15.234 | 15.2795 | 15.2764 |
| 23086 ft | 22192 ft | 11.08 in | 15.299 | 15.3445 | 15.3441 |
| 23405 ft | 22471 ft | 11.08 in | 15.306 | 15.3515 | 15.3512 |
| 23693 ft | 22722 ft | 12.25 in | 15.310 | 15.3552 | 15.3550 |
| 23724 ft | 22750 ft | 12.25 in | 15.310 | 15.3559 | 15.3558 |
| 23904 ft | 22907 ft | 12.25 in | 15.313 | 15.3582 | 15.3581 |
| 24044 ft | 23029 ft | 12.25 in | 15.316 | 15.3614 | 15.3615 |
| 24045 ft | 23030 ft | 12.25 in | 15.316 | 15.3614 | 15.3615 |

The steady-state model averages the volume of cuttings over sections of the wellbore, which can be seen in FIG. 5 where large lengths of the wellbore have the same volume of cuttings. By comparison, FIG. 6 provides a more dynamic and realistic view of the cuttings within the wellbore, which in turn provides a more accurate ECD profile.

Further, in analyzing the calculated ECDs of Table 2, the three methods yield different ECD values. Because the transient cuttings model (3) provides a more accurate representation of the cuttings, which is a major component in calculating the ECD, the calculated ECD using the transient cuttings model most likely provides the most accurate calculated ECD values. While these differences may appear minor at some positions, a more dynamic range of drilling parameters, which is often what is encountered in the field, would produce greater variances.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   drilling a wellbore penetrating a subterranean formation while circulating a drilling fluid;
   gathering real-time data about the drilling, the real-time data comprising at least one selected from the group consisting of a flow rate of the drilling fluid, a viscosity of the drilling fluid, a density of the drilling fluid, revolutions per minute of a drill bit, a rate of penetration into the subterranean formation, a torque applied to a drill string, a trajectory of the drill bit, a weight on the drill bit, a measured depth, a true vertical depth, a composition of the subterranean formation, a temperature, a pressure, and any combination thereof;
   calculating a cuttings distribution along the wellbore based on the real-time data using a transient model, wherein calculating the cuttings distribution involves dividing the wellbore into sections based on a wellbore condition and a wellbore geometry and calculating an average volume percent of cuttings in each section;
   calculating an equivalent circulating density profile along the wellbore based on (1) the cuttings distribution and (2) the real-time data; and
   changing at least one operational parameter based on a comparison of the equivalent circulating density profile to a fracture gradient of the subterranean formation.

2. The method of claim 1, wherein the at least one operational parameter includes at least one selected from the group consisting of the flow rate of the drilling fluid, the viscosity of the drilling fluid, the density of the drilling fluid, a lubricity of the drilling fluid, a composition of the drilling fluid, the revolutions per minute of the drill bit, the rate of penetration into the subterranean formation, the torque applied to the drill string, the trajectory of the drill bit, the weight on the drill bit, the wellbore pressure, and any combination thereof.

3. The method of claim 1 further comprising:
   halting the circulation of the drilling fluid through the wellbore for a time; and
   restarting the circulation of the drilling fluid through the wellbore.

4. The method of claim 1, wherein calculating the equivalent circulating density profile is further based on (3) data collected from a previous drilling operation into the subterranean formation.

5. The method of claim 1 further comprising:
   reporting the cuttings distribution as individual data points.

6. The method of claim 1 further comprising:
   reporting the cuttings distribution as the average volume percent of cuttings in each section.

7. The method of claim 1, wherein the gathering of the real-time data is continuous.

8. The method of claim 1, wherein the calculating of the equivalent circulating density profile is continuous.

9. A method comprising:
   drilling a wellbore penetrating a subterranean formation;
   gathering real-time data about the drilling, the real-time data comprising at least one selected from the group consisting of a flow rate of the drilling fluid, a viscosity of the drilling fluid, a density of the drilling fluid, revolutions per minute of a drill bit, a rate of penetration into the subterranean formation, a torque applied to a drill string, a trajectory of the drill bit, a weight on the drill bit, a measured depth, a true vertical depth, a composition of the subterranean formation, a temperature, a pressure, and any combination thereof;
   calculating a cuttings distribution based on the real-time data using a transient model, wherein calculating the cuttings distribution involves dividing the wellbore into sections based on a wellbore condition and a wellbore geometry and calculating an average volume percent of cuttings in each section;
   calculating a plurality of predicted equivalent circulating density profiles along the wellbore based on (1) a theoretical change to at least one operational parameter, (2) the cuttings distribution, and (3) the real-time data; and
   changing at least one of the operational parameters based on a comparison of the predicted equivalent circulating density profiles to a fracture gradient of the subterranean formation.

10. The method of claim 9, wherein the at least one operational parameter includes at least one selected from the group consisting of the flow rate of the drilling fluid, the viscosity of the drilling fluid, the density of the drilling fluid, a lubricity of the drilling fluid, a composition of the drilling fluid, the revolutions per minute of the drill bit, the rate of penetration into the subterranean formation, the torque applied to the drill string, the trajectory of the drill bit, the weight on the drill bit, the wellbore pressure, and any combination thereof.

11. The method of claim 9 further comprising:
   halting the circulation of the drilling fluid through the wellbore for a time; and
   restarting the circulation of the drilling fluid through the wellbore.

12. The method of claim 9, wherein calculating the predicted equivalent circulating density profile is further based on (4) data collected from a previous drilling operation into the subterranean formation.

13. The method of claim 9 further comprising:
   reporting the cuttings distribution as individual data points.

14. The method of claim 9 further comprising:
   reporting the cuttings distribution as the average volume percent of cuttings in each section.

15. A method comprising:
   drilling a wellbore penetrating a subterranean formation while circulating a drilling fluid;
   gathering real-time data about the drilling, the real-time data comprising at least one selected from the group consisting of a flow rate of the drilling fluid, a viscosity of the drilling fluid, a density of the drilling fluid, revolutions per minute of a drill bit, a rate of penetration into the subterranean formation, a torque applied to a drill string, a trajectory of the drill bit, a weight on the drill bit, a measured depth, a true vertical depth, a composition of the subterranean formation, a temperature, a pressure, and any combination thereof;
   calculating a cuttings distribution along the wellbore based on the real-time data using a transient model, wherein calculating the cuttings distribution involves dividing the wellbore into sections based on a wellbore condition and a wellbore geometry and calculating an average volume percent of cuttings in each section;

calculating an equivalent circulating density profile along the wellbore based on (1) the cuttings distribution and (2) the real-time data;

comparing the equivalent circulating density profile to a fracture gradient of the subterranean formation;

calculating a plurality of predicted equivalent circulating density profiles along the wellbore based on (1) the cuttings distribution, (2) the real-time data, and (3) a theoretical change to at least one operational parameter; and changing at least one of the operational parameters based on a comparison of the predicted equivalent circulating density profiles to the fracture gradient of the subterranean formation.

16. The method of claim 15, wherein the at least one operational parameter includes at least one selected from the group consisting of the flow rate of the drilling fluid, the viscosity of the drilling fluid, the density of the drilling fluid, a lubricity of the drilling fluid, a composition of the drilling fluid, the revolutions per minute of the drill bit, the rate of penetration into the subterranean formation, the torque applied to the drill string, the trajectory of the drill bit, the weight on the drill bit, the wellbore pressure, and any combination thereof.

17. The method of claim 15, wherein calculating the predicted equivalent circulating density profile is further based on (4) data collected from a previous drilling operation into the subterranean formation.

* * * * *